United States Patent
Mitsuno et al.

(10) Patent No.: US 10,830,729 B2
(45) Date of Patent: Nov. 10, 2020

(54) SENSOR CONTROL DEVICE AND GAS DETECTION SYSTEM

(71) Applicant: NGK SPARK PLUG CO., LTD., Nagoya (JP)

(72) Inventors: Junichiro Mitsuno, Kounan (JP); Satoru Abe, Ichinomiya (JP); Chihiro Tomimatsu, Gifu (JP); Hidetoshi Makino, Ichinomiya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 35 days.

(21) Appl. No.: 15/980,817

(22) Filed: May 16, 2018

(65) Prior Publication Data

US 2018/0335400 A1 Nov. 22, 2018

(30) Foreign Application Priority Data

May 16, 2017 (JP) .................................. 2017-097314

(51) Int. Cl.
*G01N 27/406* (2006.01)
*G01N 27/41* (2006.01)

(52) U.S. Cl.
CPC ......... *G01N 27/4065* (2013.01); *G01N 27/41* (2013.01)

(58) Field of Classification Search
CPC .......................... G01N 27/4065; G01N 27/41
See application file for complete search history.

(56) References Cited

U.S. PATENT DOCUMENTS

| | | | |
|---|---|---|---|
| 9,933,389 B2 * | 4/2018 | Higuchi | ............. G01N 27/4065 |
| 2015/0068896 A1 | 3/2015 | Inagaki | |
| 2016/0169832 A1 | 6/2016 | Higuchi et al. | |
| 2017/0099527 A1 * | 4/2017 | Propst, Jr. | .............. G08C 23/04 |

FOREIGN PATENT DOCUMENTS

JP   2016-114413 A   6/2016

* cited by examiner

*Primary Examiner* — Luan V Van
*Assistant Examiner* — Caitlyn Mingyun Sun
(74) *Attorney, Agent, or Firm* — Sughrue Mion, PLLC

(57) ABSTRACT

In a sensor control device which controls a sensor, a first filter unit extracts a first filtered signal obtained by attenuating a frequency component higher than a first cutoff frequency from a digital signal indicating a current-application control value for a pump current, and a second filter unit extracts a second filtered signal obtained by attenuating a frequency component higher than a second cutoff frequency from the first filtered signal. A cutoff frequency setting unit sets at least one of the first cutoff frequency and the second cutoff frequency such that the sensor control device can control at least two types of sensors.

16 Claims, 2 Drawing Sheets

SENSOR CONTROL DEVICE AND GAS DETECTION SYSTEM

BACKGROUND OF THE INVENTION

1. Field of the Invention

The present invention relates to: a sensor control device for controlling a sensor which includes at least one cell having a solid electrolyte and a pair of electrodes disposed on the solid electrolyte; and a gas detection system including the sensor and the sensor control device.

2. Description of the Related Art

A sensor control device for controlling a sensor which includes at least one cell is known, as well as a gas detection system including the sensor and the sensor control device.

The cell of the sensor is composed of a solid electrolyte and a pair of electrodes disposed on the solid electrolyte. The sensor includes, as the cell, at least an oxygen pump cell which pumps oxygen into or out of a measurement chamber of the sensor in accordance with a pumping current, and the sensor is configured to detect a specific component contained in a gas to be measured.

The sensor control device, for example, converts a detected analog signal into a digital signal, performs a digital process to extract a specific frequency component from the digital signal, and performs various kinds of control (feedback control and the like) using a signal having the extracted specific frequency component.

Additionally, a sensor control device has been proposed which is configured to extract, when extracting specific frequency components from a digital signal, two types of specific frequency components in different frequency bands (Patent Document 1).

[Patent Document 1] Japanese Patent Application Laid-Open (kokai) No. 2016-114413, corresponding to U.S. Publication No. US 2016/0169832 A1.

3. Problems to be Solved by the Invention

In the above-described related art sensor control device, a problem arises in that only a specific type of sensor can be controlled. This is because cutoff frequencies for the specific frequency components are fixed.

That is, the above-described conventional sensor control device is manufactured for a specific type of sensor, and thus, cannot be used for controlling any other type of sensor to which a different cutoff frequency is to be applied.

SUMMARY OF THE INVENTION

It is therefore an object of the present disclosure to provide a sensor control device and a gas detection system capable of controlling at least two types of sensors.

The above object has been achieved by providing (1) a sensor control device which controls a sensor and which includes an analog-digital conversion unit, a current-application control value calculation unit, a digital-analog conversion unit, a first filter unit, a second filter unit, and a cutoff frequency setting unit.

The sensor includes at least an oxygen pump cell which has a solid electrolyte and a pair of electrodes disposed on the solid electrolyte and which pumps oxygen into or out of a measurement chamber of the sensor in accordance with a pump current, the sensor being configured to detect a specific component contained in a gas to be measured.

The analog-digital conversion unit is configured to convert an inter-electrode voltage, which is an analog signal, between the pair of electrodes of the oxygen pump cell into a digital value. The current-application control value calculation unit is configured to perform digital control to calculate a current-application control value for the pump current to be applied to the oxygen pump cell, based on the digital value of the inter-electrode voltage. The digital-analog conversion unit is configured to generate the pump current to be applied to the oxygen pump cell, based on a digital signal indicating the current-application control value for the pump current.

The first filter unit is configured to perform digital calculation to extract a first filtered signal obtained by attenuating a frequency component higher than a predetermined first cutoff frequency from the digital signal indicating the current-application control value for the pump current. The second filter unit is configured to perform digital calculation to extract a second filtered signal obtained by attenuating a frequency component higher than a predetermined second cutoff frequency from the first filtered signal extracted by the first filter unit.

The digital-analog conversion unit is configured to generate the pump current based on the first filtered signal. The second filter unit is configured to output the second filtered signal as a pump current signal for detecting the specific component contained in the gas to be measured.

The cutoff frequency setting unit is configured to set at least one of the first cutoff frequency and the second cutoff frequencies.

The sensor control device including such a cutoff frequency setting unit enables change of the value of at least one of the first cutoff frequency and the second cutoff frequency by setting at least one of the first cutoff frequency and the second cutoff frequency, and thus, enables an increase in the number of types of controllable sensors, whereby the versatility of the sensor control device is improved.

Thus, the sensor control device can control at least two types of sensors.

In the sensor control device, even in a case where there is an individual difference among sensors of the same type, at least one of the first cutoff frequency and the second cutoff frequency may be set (changed) in accordance with the individual difference.

In the sensor control device, since the first filtered signal is a signal obtained by attenuating a frequency component (noise component) higher than the first cutoff frequency from the digital signal indicating the current-application control value for the pump current, the first filtered signal is a digital signal which indicates the current-application control value for the pump current and in which the noise component superimposed as a result of the digital calculation by the current-application control value calculation unit is attenuated. Thus, even in a case where the sampling period of the digital signal is shortened, an increase in the differential noise component of the digital signal can be suppressed.

Since the second filtered signal is a signal obtained by attenuating a frequency component (noise component) higher than the second cutoff frequency from the first filtered signal, the second filtered signal is the digital signal in which the noise component (the noise component superimposed as a result of the digital calculation by the current-application control value calculation unit) is further attenuated from the first filtered signal.

The first filtered signal has undergone filtering a fewer number of times than the second filtered signal, and thus, is a digital signal which indicates the current-application control value for the pump current and which reflects, to a relatively great extent, the most recent state of change in the inter-electrode voltage between the pair of electrodes of the oxygen pump cell. Such a digital signal is a signal suitable for feedback control of the oxygen pump cell. Thus, by applying the pump current generated based on the first filtered signal to the oxygen pump cell, pumping (pumping-out or pumping-in) of oxygen can be appropriately performed by the oxygen pump cell in accordance with the most recent state of change in the inter-electrode voltage between the pair of electrodes of the oxygen pump cell.

The second filtered signal has undergone filtering a greater number of times than the first filtered signal, and thus, is a digital signal which indicates the current-application control value for the pump current and which reflects, to a relatively great extent, a long-term change state of the inter-electrode voltage between the pair of electrodes of the oxygen pump cell. Such a digital signal is a signal suitable for detecting a specific component contained in a gas to be measured. Thus, by using the second filtered signal as a signal for detecting a specific component contained in a gas to be measured, the specific component contained in the gas to be measured can be detected based on the long-term change state of the inter-electrode voltage between the pair of electrodes of the oxygen pump cell.

Accordingly, for example, in a case where a specific component calculation unit which calculates, with use of the pump current signal, the concentration of a specific component contained in a gas to be measured receives the second filtered signal from the second filter unit, the accuracy of calculation of the concentration of the specific component by the specific component calculation unit can be improved, whereby the accuracy of detection of the specific component contained in the gas to be measured can be improved.

Thus, according to the sensor control device, even in a case where the sampling period of the digital signal is shortened, an increase in a noise component can be suppressed. In addition, according to the sensor control device, pumping of oxygen can be appropriately performed by the oxygen pump cell, and the accuracy of detection of the specific component contained in the gas to be measured can be improved.

In a preferred embodiment (2) of the above-described sensor control device (1), the cutoff frequency setting unit is configured to set at least one of the first cutoff frequency and the second cutoff frequency based on externally acquired frequency setting information.

By providing such a cutoff frequency setting unit, at least one of the first cutoff frequency and the second cutoff frequency can be set (changed) in accordance with the externally acquired frequency setting information. The frequency setting information may be preset based on, for example, the type of sensor to be controlled or the individual differences among the sensors. Accordingly, at least one of the first cutoff frequency and the second cutoff frequency can be set to an appropriate value corresponding to the type of the sensor or individual differences among the sensors.

In another preferred embodiment (3) of the above-described sensor control device (1) or (2), the first cutoff frequency is a frequency higher than the second cutoff frequency.

In this case, the first filtered signal is a digital signal including a component in a wider frequency band than the second filtered signal. More particularly, the first filtered signal is a digital signal which indicates the current-application control value for the pump current and which reflects, to a relatively great extent, the most recent state of change in the inter-electrode voltage between the pair of electrodes of the oxygen pump cell. Thus, by applying a pump current that is generated based on the first filtered signal to the oxygen pump cell, pumping of oxygen can be appropriately performed by the oxygen pump cell in accordance with the most recent state of change in the inter-electrode voltage between the pair of electrodes of the oxygen pump cell.

The second filtered signal is a digital signal including a component in a narrower frequency band than the first filtered signal. More particularly, the second filtered signal is a digital signal which indicates the current-application control value for the pump current and which reflects, to a relatively great extent, the long-term change state of the inter-electrode voltage between the pair of electrodes of the oxygen pump cell. Thus, by using the second filtered signal as a signal for detecting the specific component contained in the gas to be measured, the specific component contained in the gas to be measured can be detected based on the long-term change state of the inter-electrode voltage between the pair of electrodes of the oxygen pump cell, whereby the accuracy of detection of the specific component can be improved.

In a second mode (4), the present disclosure provides a gas detection system including: a sensor including at least an oxygen pump cell which has a solid electrolyte and a pair of electrodes disposed on the solid electrolyte and which pumps oxygen into or out of a measurement chamber of the sensor in accordance with a pump current, the sensor being configured to detect a specific component contained in a gas to be measured; and a sensor control device configured to control the sensor. The sensor control device is any one of the above-described sensor control devices (1) to (3).

By including any one of the above-described sensor control devices, the gas detection system can control at least two types of sensors, similarly to the above-described sensor control devices.

DESCRIPTION OF REFERENCE NUMERALS

Figure 1:
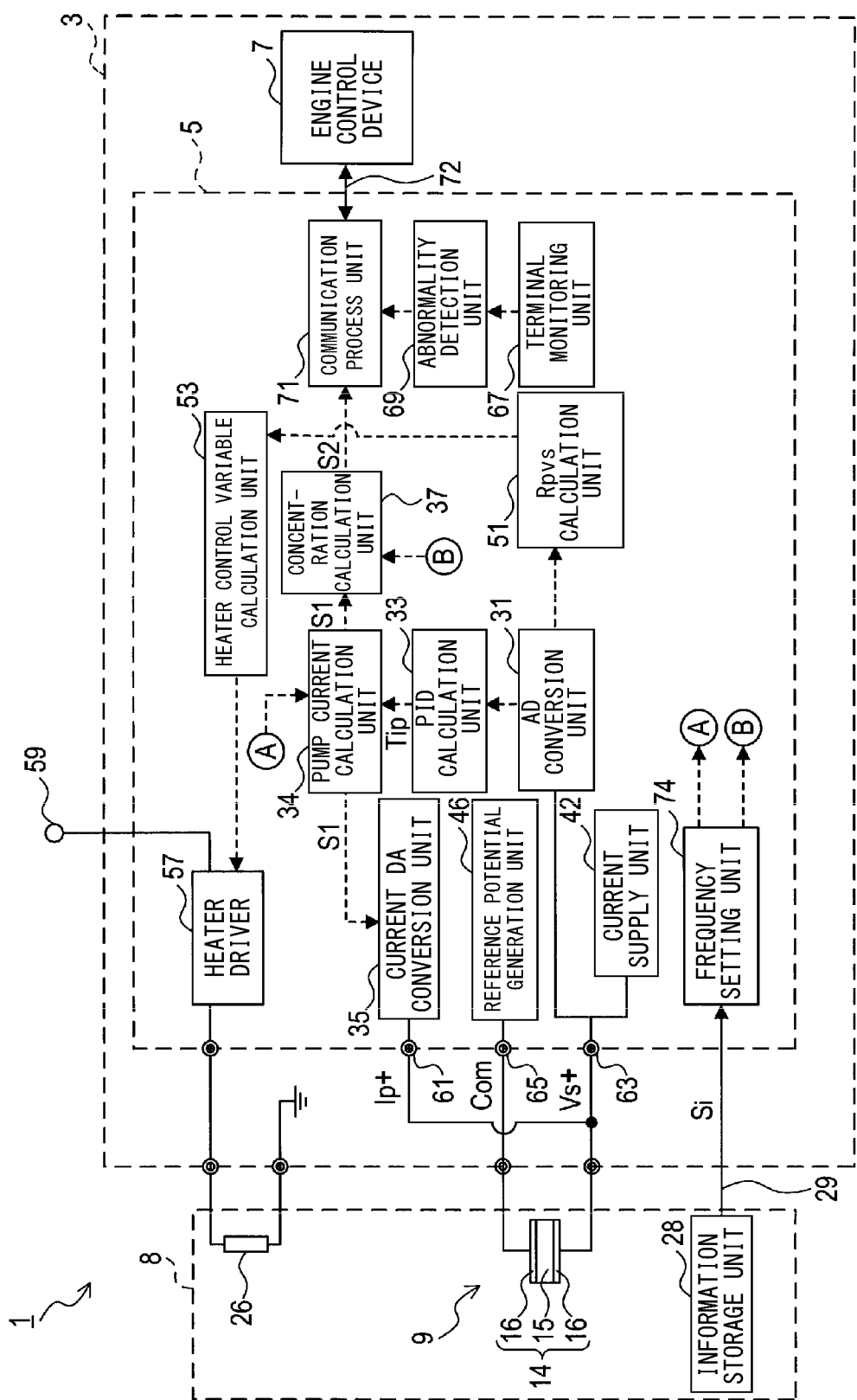
FIG. 1 is an entire configuration diagram of a gas detection system including a sensor control device.

Reference numerals used to identify various features in the drawings include the following.

1: gas detection system; 3: gas detection apparatus; 5: sensor control device; 7: engine control device; 8: gas sensor; 9: sensor element; 14: pump cell; 15: solid electrolyte; 16: porous electrode; 28: information storage unit; 29: connection line; 31: analog-digital conversion unit (AD conversion unit); 33: PID calculation unit; 34: pump current calculation unit; 35: current digital-analog conversion unit (current DA conversion unit); 37: concentration calculation unit; 42: current supply unit; 46: reference potential generation unit; 51: Rpvs calculation unit; 53: heater control variable calculation unit; 74: frequency setting unit; 78:

manipulation unit; 101: second gas detection system; 105: second sensor control device; and 108: second gas sensor.

DETAILED DESCRIPTION OF THE PREFERRED EMBODIMENTS

Hereinafter, embodiments to which the present disclosure is applied will be described in detail with reference to the drawings. However, the present invention should not be construed as being limited thereto.

Further, U.S. Publication No. US 2016/0169832 to Higuchi et al and U.S. Publication No. US 2015/0068896 to Inagaki which describe a sensor control device including a digital filter and a gas sensor, are incorporated herein by reference in their entirety.

1. First Embodiment

1-1. Entire Configuration

FIG. 1 is an entire configuration diagram of a gas detection system 1 according to an embodiment of the present disclosure.

The gas detection system 1 is used for the purpose of, for example, detecting a specific gas (oxygen in the present embodiment) in exhaust gas from an internal combustion engine.

The gas detection system 1 includes a gas detection apparatus 3 and a gas sensor 8.

The gas detection apparatus 3 includes a sensor control device 5 and an engine control device 7.

The sensor control device 5 performs drive control of the gas sensor 8, detects the concentration of oxygen in exhaust gas, and reports the detected oxygen concentration to the engine control device 7. The sensor control device 5 will be described in detail below.

The engine control device 7 is a microcontroller for performing various control processes for controlling the internal combustion engine, and performs, as one of the various control processes, air-fuel ratio control on the internal combustion engine using the oxygen concentration detected by the sensor control device 5.

The gas sensor 8 is an oxygen sensor which detects oxygen. The gas sensor 8 is mounted on an exhaust pipe of the internal combustion engine (engine), detects the concentration of oxygen in exhaust gas over a wide range, and is also called a linear lambda sensor. The gas sensor 8 is composed of a sensor element 9, a heater 26, and an information storage unit 28.

The sensor element 9 is composed of a pump cell 14. The pump cell 14 includes: a solid electrolyte 15, having oxygen ion conductivity, which is formed from a partially stabilized zirconia ($ZrO_2$); and a pair of porous electrodes 16 formed mainly of platinum which are respectively arranged on the front surface and the rear surface of the solid electrolyte 15.

The heater 26 is composed of a heat generating resistor which generates heat by external energization. The heater 26 is provided for heating the sensor element 9 (particularly, the pump cell 14), thereby bringing the sensor element 9 (pump cell 14) into an activated state (a state where gas detection can be performed).

The sensor element 9 includes therein: a measurement chamber (not shown) to which one of the pair of porous electrodes 16 of the pump cell 14 is exposed; and a reference oxygen chamber (not shown) to which the other one of the pair of porous electrodes 16 of the pump cell 14 is exposed. Into the measurement chamber, a gas (exhaust gas in the present embodiment) to be measured is introduced from outside via a porous diffusion layer (not shown). Air is introduced from outside as a reference gas into the reference oxygen chamber.

The sensor element 9 is an oxygen sensor element which detects the oxygen concentration by a so-called limiting current method. In an output characteristic indicating the relationship between an application voltage Vp and a pump current Ip in the pump cell 14, there is a flat region parallel to the voltage axis, that is, a region (limiting current region) of limiting current in which the pump current Ip is constant. The flat region (limiting current region) is a region in which the pump current Ip is substantially unchanged but maintains a constant value (limiting current) even when the application voltage Vp is changed.

The flat region is a limiting current region which indicates a pump current Ip corresponding to an oxygen concentration (i.e., air-fuel ratio) and in which a change in the limiting current corresponds to a change in the oxygen concentration. The pump current Ip in the limiting current region becomes larger as the oxygen concentration becomes higher. Thus, the concentration of oxygen in exhaust gas can be detected by applying an application voltage Vp corresponding to the limiting current region to the pump cell 14 of the sensor element 9 and detecting a pump current Ip obtained by applying the application voltage Vp. That is, since the limiting current of the pump current Ip increases as the concentration of oxygen in the exhaust gas increases (as the air-fuel ratio approaches the lean side), and since the limiting current decreases as the concentration of oxygen in the exhaust gas decreases (as the air-fuel ratio approaches the rich side), the oxygen concentration (air-fuel ratio) can be detected based on the limiting current.

In the present embodiment, the application voltage Vp is applied to the pair of porous electrodes 16 of the pump cell 14 of the sensor element 9, to cause the pump current Ip to flow between the pair of porous electrodes 16, so that oxygen is pumped by the pump current Ip (e.g., oxygen is moved between a measurement chamber and a reference oxygen chamber). As is well known, the oxygen concentration can be detected based on the current value (limiting current) at which the pump current Ip at the time of pumping is kept constant.

That is, the gas sensor 8 is used for the purpose of detecting the concentration of oxygen contained in a gas to be measured (exhaust gas), based on the current value (limiting current) at which the pump current Ip at the time of pumping by the sensor element 9 is kept constant.

The information storage unit 28 stores information (sensor information Si) about the sensor element 9. The information storage unit 28 according to the present embodiment stores, as sensor information Si, at least one of information (sensor type information $Si^1$) about the type of the sensor element 9 and information (individual difference information Si2) about individual differences among the sensor elements 9.

Examples of the sensor type information Si1 include information about a detection target gas type (oxygen, NOx, etc.), and information about the structure (one-cell structure, two-cell structure, etc.) of the sensor element. The individual difference information Si2 is information about a detection characteristic considering the influence of individual differences among the sensor elements 9, among detection characteristics of the sensor elements 9 of the same type.

The information storage unit 28 is configured so as to be capable of providing the sensor information Si to the sensor control device 5 (specifically, frequency setting unit 74 described below) by being connected to the sensor control device 5 through a connection line 29. The information storage unit 28 is implemented by, for example, a storage device such as a ROM and a RAM.

1-2. Sensor Control Device

The sensor control device 5 is configured to perform drive control of the gas sensor 8, detect the concentration of oxygen in exhaust gas, and report the detected oxygen concentration to the engine control device 7.

The sensor control device 5 includes a microcomputer (not shown). The microcomputer includes a CPU, a ROM, a RAM, and a signal input/output unit. Various functions of the sensor control device 5 are realized by the CPU executing programs stored in a non-transitive substantive recording medium. In this example, the ROM corresponds to the non-transitive substantive recording medium which stores the programs. By execution of the programs, methods corresponding to the programs are performed. The signal input/output unit transmits/receives various signals to/from an external device. The numbers of the CPUs, the ROMs, the RAMs, and the signal input/output units included in the microcomputer may be one or more. Some or all of the functions which are performed by the microcomputer may be implemented by hardware such as one or more ICs. In FIG. 1, the sensor control device 5 is shown as a functional block diagram.

The sensor control device 5 includes an AD conversion unit 31 (analog-digital conversion unit 31), a PID calculation unit 33, a pump current calculation unit 34, a current DA conversion unit 35 (current digital-analog conversion unit 35), a concentration calculation unit 37, a current supply unit 42, and a reference potential generation unit 46. In addition, the sensor control device 5 includes an Rpvs calculation unit 51, a heater control variable calculation unit 53, and a heater driver 57. Moreover, the sensor control device 5 includes a pump current terminal 61 (Ip+ terminal 61), a detection voltage terminal 63 (Vs+ terminal 63), a reference potential terminal 65 (COM terminal 65), a terminal monitoring unit 67, an abnormality detection unit 69, a communication process unit 71, and a frequency setting unit 74.

The current supply unit 42 is configured to supply various currents to the sensor element 9 (specifically, pump cell 14) via a detection voltage terminal 63. Examples of the various currents include a pulse current Irpvs for detecting the internal resistance value of the sensor element 9 (pump cell 14) and a minute current Icp which is flowed between the pair of porous electrodes 16 for functioning a one of the pair of porous electrodes 16 as an oxygen reference electrode which serves as a reference for detecting oxygen concentration. The current supply unit 42 is not configured to constantly supply these currents, but is configured to supply the currents at respective appropriate timings.

The reference potential generation unit 46 sets the potential of the reference potential terminal 65 (COM terminal 65) to a predetermined potential. Specifically, a potential obtained by adding a reference setting voltage (2.7 V in the present embodiment) to a ground potential GND of the internal combustion engine as a reference is set as the potential of the reference potential terminal 65. In the present embodiment, the potential of the reference potential terminal 65 corresponds to a reference potential at the time of control of the sensor element 9 (pump cell 14).

The AD conversion unit 31 detects a voltage (detected voltage Vs) between both ends of the pump cell 14 based on the potential of the detection voltage terminal 63 and the potential of the reference potential terminal 65, and converts an analog value indicating the detected voltage Vs to a digital value. The AD conversion unit 31 reports the converted digital value to units (e.g., the PID calculation unit 33 and the Rpvs calculation unit 51) of the sensor control device 5.

When the minute current Icp is inputted by the current supply unit 42, or when the pump current Ip is inputted by the current DA conversion unit 35, the voltage (detected voltage Vs) between both ends of the pump cell 14 can be used as a sensor output signal Vs1 which changes in accordance with the concentration of oxygen in the measurement chamber. In addition, when the pulse current Irpvs is inputted by the current supply unit 42, the voltage (detected voltage Vs) between both ends of the pump cell 14 can be used as a response signal Vs2 which changes in accordance with the internal resistance value of the pump cell 14.

The PID calculation unit 33 is configured to digitally perform a pump current control process. The pump current control process is a control process for controlling the pump current Ip to be applied to the pump cell 14 such that the detected voltage Vs (sensor output signal Vs1) of the pump cell 14 reaches a target control voltage (e.g., 450 mV in the present embodiment). The PID calculation unit 33 which performs the pump current control process, performs a PID calculation based on a deviation ΔVs between the target control voltage (450 mV) and the detected voltage Vs (sensor output signal Vs1) of the pump cell 14, thereby calculating a current-application control value (current-application control current Tip) for the pump current Ip to be applied to the pump cell 14 such that the deviation ΔVs approaches 0 (in other words, such that the detected voltage Vs approaches the target control voltage).

The pump current calculation unit 34 performs a digital calculation to extract a DAC control signal S1 (first filtered signal S1) obtained by attenuating a frequency component higher than a predetermined first cutoff frequency (100 Hz in the present embodiment) from a digital signal indicating the current-application control current Tip calculated by the PID calculation unit 33.

Since the DAC control signal S1 is a signal obtained by attenuating a frequency component (noise component) higher than the first cutoff frequency from the digital signal indicating the current-application control current Tip for the pump current Ip, the DAC control signal S1 is a digital signal which indicates the current-application control current Tip for the pump current Ip and in which the noise component superimposed as a result of the digital calculation by the PID calculation unit 33 is attenuated. Thus, even in a case where the sampling period of the pump current Ip (digital signal) is shortened, an increase in the differential noise component of the pump current Ip can be suppressed.

The concentration calculation unit 37 performs digital calculation to extract a gas detection signal S2 (second filtered signal S2) obtained by attenuating a frequency component higher than a predetermined second cutoff frequency (50 Hz in the present embodiment) from the digital signal indicating the DAC control signal S1 extracted by the pump current calculation unit 34.

Since the gas detection signal S2 is a signal obtained by attenuating a frequency component (noise component) higher than the second cutoff frequency from the DAC control signal S1, the gas detection signal S2 is a digital signal in which the noise component (the noise component superimposed as a result of the digital calculation by the pump current calculation unit 34) is further attenuated from the DAC control signal S1.

The DAC control signal S1 has undergone filtering a fewer number of times than the gas detection signal S2, and thus, is a digital signal which indicates the current-application control current Tip for the pump current Ip and which reflects, to a relatively great extent, the most recent state of change in the detected voltage Vs of the pump cell 14. Since such a digital signal is a signal suitable for feedback control of the pump cell 14, pumping (pumping-out or pumping-in) of oxygen can be appropriately performed by the pump cell 14 in accordance with the most recent state of change in the detected voltage Vs of the pump cell 14, by applying the pump current Ip generated based on the DAC control signal S1 to the pump cell 14. The DAC control signal S1 is a digital signal including information about current-application directions (positive and negative directions) and a current value of the current-application control value for the pump current Ip.

The current DA conversion unit 35 receives the DAC control signal S1 (digital value) calculated by the pump current calculation unit 34, performs DA conversion of the received DAC control signal S1, and applies the pump current Ip as an analog value obtained by the DA conversion to the pump cell 14.

Next, the gas detection signal S2 has undergone filtering a greater number of times than the DAC control signal S1, and thus, is a digital signal which indicates the current-application control current Tip for the pump current Ip and which reflects, to a relatively great extent, a long-term change state of the detected voltage Vs of the pump cell 14. Such a digital signal is a signal suitable for detecting a specific component (oxygen) contained in a gas (exhaust gas) to be measured. Thus, by using the gas detection signal S2 as a signal for detecting the concentration of oxygen contained in exhaust gas, the concentration of oxygen contained in the exhaust gas can be detected based on the long-term change state of the detected voltage Vs of the pump cell 14. Accordingly, the accuracy of detection of the oxygen concentration can be improved.

The communication process unit 71 performs a communication control process for transmitting/receiving various kinds of information to/from the engine control device 7 via SPI communication (serial peripheral interface communication) performed through an SPI communication line 72. The communication process unit 71 transmits/receives information including at least control information about sensor control. For example, the communication process unit 71 transmits the gas detection signal S2 to the engine control device 7.

In addition, the communication process unit 71 has a function of determining whether or not the state of communication with the engine control device 7 is an abnormality state (communication abnormality). When determining that the communication state is in a normal state, the communication process unit 71 resets a communication abnormality flag Fcf (Fcf=0). When determining that the communication state is in an abnormal state, the communication process unit 71 sets the communication abnormality flag Fcf (Fcf=1). The communication abnormality flag Fcf is one of internal flags for use in various control processes by the sensor control device 5. The communication process unit 71 transmits information to the engine control device 7 after confirming that the communication abnormality flag Fcf is in a reset state.

The engine control device 7 calculates the concentration of a specific gas (oxygen in the present embodiment) in exhaust gas based on the gas detection signal S2. That is, the engine control device 7 calculates the concentration of oxygen contained in the gas to be measured, based on the history data of the pump current Ip which is caused to flow through the pump cell 14 such that the concentration of oxygen in the measurement chamber reaches a predetermined target concentration (e.g., an oxygen concentration equivalent to a stoichiometric air-fuel ratio).

The sensor control device 5 includes an EEPROM and a RAM which are not shown. The EEPROM is a storage unit which stores the details of a control process, various parameters for use in the control process, and the like. In addition, the EEPROM stores various kinds of information (the maximum allowable current of the pump cell 14, and the like) determined in accordance with the type or the characteristic of the gas sensor 8 to be controlled. These kinds of information are stored in the EEPROM at the manufacturing stage of the sensor control device 5. The RAM is a storage unit which temporarily stores control data and the like for use in the various control processes.

The Rpvs calculation unit 51 calculates the internal resistance value Rpvs of the pump cell 14 based on the response signal Vs2 and the sensor output signal Vs1 reported by the AD conversion unit 31.

The heater control variable calculation unit 53 performs digital calculation to calculate the temperature of the gas sensor 8 (specifically, the pump cell 14 of the sensor element 9) based on the internal resistance value Rpvs calculated by the Rpvs calculation unit 51, and calculates a heat generation amount, of the heater, required for bringing the calculated temperature close to a target sensor temperature or for maintaining the calculated temperature. The heater control variable calculation unit 53 calculates, based on the calculated heat generation amount of the heater, a duty ratio of power to be supplied to the heater 26, and generates a PWM (Pulse-Width-Modulated) control signal corresponding to the duty ratio.

As the target sensor temperature, a predetermined value is stored in the storage unit (the ROM, the RAM, etc.). The heater control variable calculation unit 53 generates the PWM control signal by using the target sensor temperature read out from the storage unit.

The heater driver 57 performs control so as to apply a current to the heater 26 based on the PWM control signal from the heater control variable calculation unit 53 by using the power supplied from the power supply device 59. Accordingly, the heat generation amount of the heater 26 becomes the heat generation amount required for bringing the temperature of the gas sensor 8 close to the target sensor temperature or for maintaining the temperature of the gas sensor 8.

The pump current terminal 61 and the detection voltage terminal 63 are connected to one of the pair of porous electrodes 16 of the pump cell 14 of the sensor element 9, and the reference potential terminal 65 is connected to the other one of the pair of porous electrodes 16. Inside the gas detection apparatus 3, the pump current terminal 61 is electrically connected to the porous electrode 16 by a connection path between the detection voltage terminal 63 and the sensor element 9 (porous electrode 16).

The terminal monitoring unit 67 detects the potentials (analog values) of the pump current terminal 61, the detection voltage terminal 63, and the reference potential terminal 65, performs AD conversion of the detected potentials, and transmits the converted potentials (digital values) to the abnormality detection unit 69.

The abnormality detection unit 69 determines whether or not the potentials of the pump current terminal 61, the detection voltage terminal 63, and the reference potential terminal 65 fall within a predetermined normality range, and among those terminals having a potential which deviates from the normality range, determines which is in an abnormality state. For example, upon occurrence of a wiring abnormality state (ground short-circuiting abnormality state) where any of the terminals is erroneously electrically connected to the ground potential GND, or upon occurrence of a wiring abnormality state (battery short-circuiting abnormality state) where the terminal is erroneously connected to the power supply device 59, the potential of the terminal deviates from the normality range.

That is, the abnormality detection unit 69 is configured to detect, based on the potentials of the terminals (the pump current terminal 61, the detection voltage terminal 63, and the reference potential terminal 65), a control abnormality including at least a wiring abnormality in wiring which connects the sensor element 9 and each of the current DA conversion unit 35, the current supply unit 42, and the reference potential generation unit 46 to each other. When determining that at least one of the terminals is in an abnormality state, the abnormality detection unit 69 transmits an abnormality information signal including information about the terminal determined to be in the abnormality state, to the PID calculation unit 33, the heater control variable calculation unit 53, and the like.

Upon receiving the abnormality information signal, the PID calculation unit 33 and the heater control variable calculation unit 53 perform abnormality handling processes in accordance with the abnormality information signal. For example, the PID calculation unit 33 performs, as the abnormality handling process, a process of stopping current application to the pump cell 14. In addition, the heater control variable calculation unit 53 performs, as the abnormality handling process, a process of reducing power (in other words, the duty ratio of a voltage to be applied to the heater) to be supplied to the heater 26.

In addition, in a case where any of the terminals is determined to be in an abnormality state, the abnormality detection unit 69 transmits, via the communication process unit 71, the abnormality information signal including information about the terminal determined to be in the abnormality state, to the engine control device 7. The engine control device 7 determines that the gas detection signal S2 outputted from the sensor control device 5 during reception of the abnormality information signal is not a normal value but an abnormal value, and performs a concentration detection process without using the gas detection signal S2 for detection of the oxygen concentration. Accordingly, the engine control device 7 enables suppression of reduction in the accuracy of detection, of the oxygen concentration, based on the gas detection signal S2 from the sensor control device 5.

1-3. Frequency Setting Unit

The frequency setting unit 74 is configured to set the first cutoff frequency for the pump current calculation unit 34 and the second cutoff frequency for the concentration calculation unit 37 to respective predetermined values. The frequency setting unit 74 is configured to receive the sensor information Si from the information storage unit 28 through the connection line 29. In the present embodiment, the sensor information Si includes the information (sensor type information Si1) about the type of the sensor element 9, and the sensor type information Si1 includes information (frequency setting information Sf) about the first cutoff frequency and the second cutoff frequency which are suitable for detection of the oxygen concentration with use of the sensor element 9.

The frequency setting unit 74 is configured to, at the time of start-up of the sensor control device 5, receive at least the frequency setting information Sf from the information storage unit 28, and set the first cutoff frequency for the pump current calculation unit 34 and the second cutoff frequency for the concentration calculation unit 37 based on the received frequency setting information Sf. As described above, in the present embodiment, the first cutoff frequency is set to 100 Hz, and the second cutoff frequency is set to 50 Hz.

Accordingly, since the first cutoff frequency and the second cutoff frequency are set to appropriate numerical values in accordance with the type of the sensor element 9 (gas sensor 8) to be controlled, the sensor control device 5 enables gas detection to be appropriately performed in accordance with the type of the sensor element 9.

In a case where the type of the sensor element 9 (gas sensor 8) to be controlled is changed, the frequency setting unit 74 sets (changes) the first cutoff frequency and the second cutoff frequency to appropriate numerical values in accordance with the changed sensor element 9, at the time of start-up of the sensor control device 5. Thus, even in a case where the type of the sensor element 9 (gas sensor 8) to be controlled is changed, the sensor control device 5 enables gas detection to be appropriately performed in accordance with the type of the sensor element 9.

The sensor information is not limited to the sensor type information, but may be the information (individual difference information) about the individual differences among the sensor elements 9. In addition, the sensor information may include at least both the sensor type information and the individual difference information.

1-4. Effects

As described above, the gas detection system 1 according to the present embodiment includes the sensor control device 5 which controls the gas sensor 8.

As described above, the sensor control device 5 includes the pump current calculation unit 34, the concentration calculation unit 37, and the frequency setting unit 74.

The pump current calculation unit 34 performs digital calculation to extract the DAC control signal S1 (first filtered signal S1) obtained by attenuating a frequency component higher than the first cutoff frequency from a digital signal indicating the current-application control current Tip calculated by the PID calculation unit 33. Since the DAC control signal S1 is a signal obtained by attenuating a frequency component (noise component) higher than the first cutoff frequency from the digital signal indicating the current-application control current Tip for the pump current Ip, the DAC control signal S1 is a digital signal which indicates the current-application control current Tip for the pump current Ip and in which the noise component superimposed as a result of the digital calculation by the PID calculation unit 33 is attenuated. Thus, even in a case where the sampling period of the pump current Ip (digital signal) is shortened, an increase in the differential noise component of the pump current Ip can be suppressed.

The concentration calculation unit 37 performs digital calculation to extract the gas detection signal S2 (second filtered signal S2) obtained by attenuating a frequency component higher than the second cutoff frequency from the DAC control signal S1 extracted by the pump current calculation unit 34. Since the gas detection signal S2 is a signal obtained by attenuating the frequency component (noise component) higher than the second cutoff frequency from the DAC control signal S1, the gas detection signal S2 is a digital signal in which the noise component (the noise component superimposed as a result of the digital calculation by the pump current calculation unit 34) is further attenuated from that present in the DAC control signal S1.

The DAC control signal S1 undergoes filtering a fewer number of times than the gas detection signal S2. Thus, the DAC control signal S1 is a digital signal which indicates the current-application control current Tip for the pump current Ip and which reflects, to a relatively great extent, the most recent state of change in the detected voltage Vs of the pump cell 14. Since such a digital signal is a signal suitable for feedback control of the pump cell 14, pumping (pumping-out or pumping-in) of oxygen can be appropriately performed by the pump cell 14 in accordance with the most recent state of change in the detected voltage Vs of the pump cell 14, by application of the pump current Ip generated based on the DAC control signal S1 to the pump cell 14.

The gas detection signal S2 has undergone filtering a greater number of times than the DAC control signal S1. Thus, S2 is a digital signal which indicates the current-application control current Tip for the pump current Ip and which reflects, to a relatively great extent, a long-term change state of the detected voltage Vs of the pump cell 14. S2 is a digital signal suitable for detecting a specific component (oxygen) contained in a gas (exhaust gas) to be measured. Thus, by using the gas detection signal S2 as a signal for detecting the concentration of oxygen contained in exhaust gas, the concentration of oxygen contained in the exhaust gas can be detected based on the long-term change state of the detected voltage Vs of the pump cell 14. Accordingly, the accuracy of detection of the oxygen concentration can be improved.

Next, at the time of start-up of the sensor control device 5, the frequency setting unit 74 sets the first cutoff frequency for the pump current calculation unit 34 and the second cutoff frequency for the concentration calculation unit 37 based on the sensor information Si (particularly, frequency setting information Sf) acquired from the information storage unit 28.

Accordingly, since the first cutoff frequency and the second cutoff frequency are set to appropriate numerical values in accordance with the type of the sensor element 9 (gas sensor 8) to be controlled, the sensor control device 5 enables gas detection to be appropriately performed in accordance with the type of the sensor element 9.

Since the first cutoff frequency and the second cutoff frequency can be set (changed), such a sensor control device 5 enables an increase in the types of controllable sensors, whereby versatility is improved. That is, the sensor control device 5 can control at least two types of sensors.

In a case where the type of the sensor element 9 (gas sensor 8) to be controlled is changed, the frequency setting unit 74 sets (changes) the first cutoff frequency and the second cutoff frequency to appropriate numerical values in accordance with the changed sensor element 9, at the time of start-up of the sensor control device 5. Thus, even in a case where the type of the sensor element 9 (gas sensor 8) to be controlled is changed, the sensor control device 5 enables gas detection to be appropriately performed in accordance with the type of the sensor element 9 and without a user performing any operation of changing the setting of the cutoff frequency.

Next, the gas detection system 1 has a configuration in which the information storage unit 28 which stores the frequency setting information Sf is included in the gas sensor 8. Thus, in the sensor control device 5, the frequency setting information Sf suitable for the gas sensor 8 can be reliably acquired, and the first cutoff frequency and the second cutoff frequency can be set (changed) to appropriate numerical values in accordance with the type of the gas sensor 8 (sensor element 9) to be controlled.

That is, in a configuration in which the gas sensor 8 (sensor element 9) and the information storage unit 28 are arranged separately from each other, there is a possibility that the gas sensor 8 (sensor element 9) and the information storage unit 28 are inappropriately associated with each other. In that case, the frequency setting information Sf acquired from the information storage unit 28 is information unrelated to the gas sensor 8 to be controlled.

On the other hand, in the sensor control device 5, since the frequency setting information Sf suitable for the gas sensor 8 (sensor element 9) can be reliably acquired, the first cutoff frequency and the second cutoff frequency can be set (changed) to appropriate numerical values in accordance with the type of the gas sensor 8 (sensor element 9), and gas detection can be appropriately performed in accordance with the type of the sensor element 9.

Next, by including the sensor control device 5 which exhibits the above-described effects, the gas detection system 1 can control at least two types of sensors, similarly to the sensor control device 5.

1-5. Corresponding Structure

Corresponding structure in the drawings and specification to the terms used herein is as follows.

The sensor control device 5 corresponds to an example of the sensor control device, the gas sensor 8 corresponds to an example of the sensor, the pump cell 14 corresponds to an example of the cell, and the gas detection system 1 corresponds to an example of the gas detection system.

The AD conversion unit 31 corresponds to an example of the analog-digital conversion unit, the PID calculation unit 33 corresponds to an example of the current-application control value calculation unit, and the current DA conversion unit 35 corresponds to an example of the digital-analog conversion unit.

The pump current calculation unit 34 corresponds to an example of the first filter unit, the DAC control signal S1 corresponds to an example of the first filtered signal, the concentration calculation unit 37 corresponds to an example of the second filter unit, the gas detection signal S2 corresponds to an example of the second filtered signal, and the frequency setting unit 74 corresponds to an example of the cutoff frequency setting unit.

2. Second Embodiment 2-1. Entire Configuration

In a second embodiment, a second gas detection system 101 will be described which includes a second sensor control device 105 configured to allow a user to set cutoff frequencies (first cutoff frequency, second cutoff frequency) using a manipulation unit.

Figure 2:
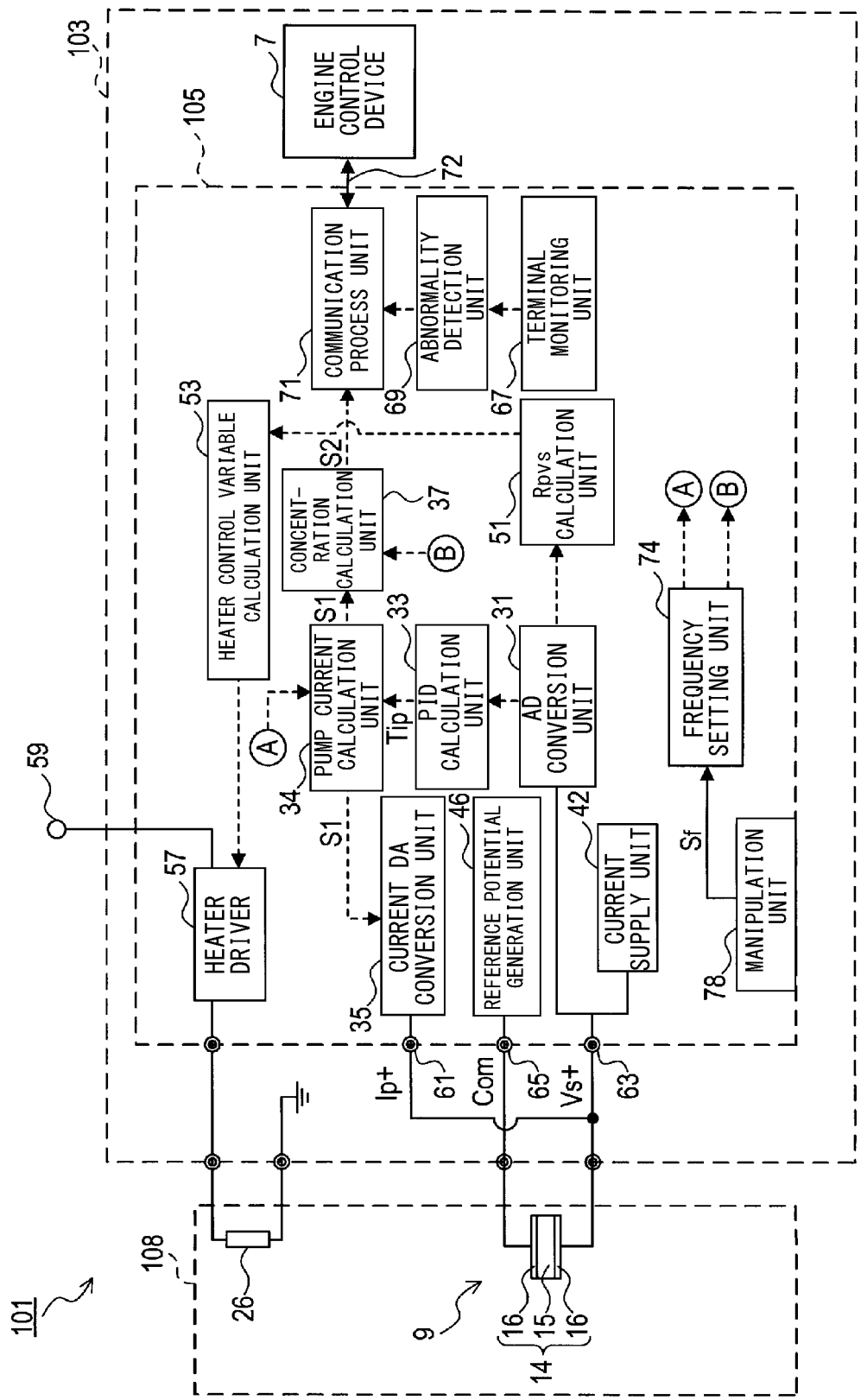
FIG. 2 is an entire configuration diagram of a second gas detection system including a second sensor control device.

FIG. 2 is an entire configuration diagram of the second gas detection system 101 according to the present disclosure.

The second gas detection system 101 is used for the purpose of, for example, detecting a specific gas (oxygen in the present embodiment) in exhaust gas from the internal combustion engine. The second gas detection system 101 includes a second gas sensor 108 and a second gas detection apparatus 103. The second gas detection apparatus 103 includes the second sensor control device 105 and the engine control device 7.

In the second gas detection system 101, the engine control device 7 is a component similar to that in the above-described gas detection system 1, but other components are different from those in the above-described gas detection system 1. Thus, hereinafter, differences from the first embodiment will mainly be described. In addition, the same components in the second embodiment as those in the first embodiment will be described while being designated by the same reference numerals. The configuration of the second sensor control device 105 is partly different from that of the sensor control device 5.

The second gas sensor 108 is composed of the sensor element 9 and the heater 26. That is, the second gas sensor 108 is different from the gas sensor 8 at least in that the second gas sensor 108 does not include the information storage unit 28.

The configuration of the second sensor control device 105 is partly different from that of the sensor control device 5 at least in terms of the cutoff frequency reception method performed by the frequency setting unit 74 and in that the second sensor control device 105 includes a manipulation unit 78. The manipulation unit 78 is implemented by, for example, a keyboard or a touch panel.

The frequency setting unit 74 is configured to receive at least the frequency setting information Sf inputted by a user with use of the manipulation unit 78, and to set the first cutoff frequency for the pump current calculation unit 34 and the second cutoff frequency for the concentration calculation unit 37 based on the received frequency setting information Sf that has been received. In the second embodiment, for example, the first cutoff frequency is set to 120 Hz, and the second cutoff frequency is set to 60 Hz.

Accordingly, in the second sensor control device 105, the first cutoff frequency and the second cutoff frequency can be set in accordance with the input manipulation by the user. As a result, it becomes possible to, for example, set (change) the cutoff frequencies in accordance with the type of the second gas sensor 108 (sensor element 9) or the individual difference among the second gas sensors 108 (sensor elements 9), or the condition (temperature, humidity, etc.) of a measurement environment. Thus, in the second sensor control device 105, even in a case where the second gas sensor 108 is exchanged for another one or the condition of the measurement environment is changed, the cutoff frequencies can be appropriately set through the input manipulation by the user. Consequently, gas detection can be appropriately performed in accordance with the type of sensor or individual differences among the sensors, or the condition of the measurement environment.

2-2. Effects

As described above, in the second gas detection system 101 according to the second embodiment, the second sensor control device 105 includes the manipulation unit 78 and is configured to allow the first cutoff frequency and the second cutoff frequencies to be set in accordance with the input manipulation by the user.

Thus, in a case where the second gas sensor 108 is exchanged for another one or the condition of the measurement environment is changed, the second sensor control device 105 enables gas detection to be appropriately performed in accordance with the type of the sensor or individual differences among the sensors, or the condition of the measurement environment, through appropriate setting of the cutoff frequencies by the user.

In addition, similarly to the sensor control device 5, the second sensor control device 105 enables the first cutoff frequency and the second cutoff frequency to be set (changed), and thus, enables an increase in the number of the types of controllable sensors, whereby the versatility is improved and at least two types of sensors can be controlled.

2-3. Corresponding Structure

Corresponding structure in the drawings and specification to the terms used herein is as follows.

The second sensor control device 105 corresponds to an example of the sensor control device. The second gas detection system 101 corresponds to an example of the gas detection system.

3. Other Embodiments

While certain embodiments have been described above, the present disclosure is not limited thereto, and may be carried out in various modes without deviating from the gist of the present disclosure.

For example, although in the above-described embodiments, the cutoff frequency setting unit (frequency setting unit 74) sets (changes) both the first cutoff frequency and the second cutoff frequency, the cutoff frequency setting unit is not limited to such embodiments. For example, the cutoff frequency setting unit may be configured to set (change) at least one of the first cutoff frequency and the second cutoff frequency.

Next, although in the above-described embodiment, the sensor information Si received by the frequency setting unit 74 from the information storage unit 28 includes the sensor type information Si1, and the sensor type information Si1 includes the frequency setting information Sf, the sensor information Si is not limited to such an embodiment. For example, the sensor information Si may include the individual difference information Si2 instead of the sensor type information Si1, and the individual difference information Si2 may include the frequency setting information Sf. Alternatively, the sensor information Si may include both the sensor type information Si1 and the individual difference information Si2, and include the frequency setting information Sf reflecting both the sensor type information Si1 and the individual difference information Si2.

Next, although the information storage unit is integrated with the sensor in the above-described first embodiment, the arrangement position of the information storage unit is not limited to such an embodiment. For example, a storage medium or the like may be arranged as the information storage unit separately from the sensor.

Although, in the above-described first embodiment, the timing at which the frequency setting unit 74 sets the cutoff frequencies is the timing of start-up of the sensor control device 5, the cutoff frequency setting timing may be a timing at which a user performs setting manipulation.

Next, although the current control device (sensor control device) which supplies the control current to the element portion (sensor element 9) including only one cell (pump cell 14) is described in the above-described embodiments, the element portion to be controlled is not limited to one having such a configuration, but may be an element portion including two or more cells. For example, a current control device may be used which supplies the control current to an element portion (two-cell-type element portion) including the pump cell and an electromotive force cell (detection cell). In a case where a sensor including the two-cell-type element portion and the heater unit is controlled using the above-described sensor control device 5 or the above-described second sensor control device 105, the pump cell is connected between the pump current terminal 61 and the reference potential terminal 65, and the electromotive force cell (detection cell) is connected between the detection voltage terminal 63 and the reference potential terminal 65. Also in the current control device (sensor control device) used in such a manner, abnormality determination can be performed using the abnormality determination device according to the present disclosure.

Next, the function of one component in each of the above-described embodiments may be shared by a plurality of components, or the functions of a plurality of components may be performed by one component. In addition, a part of the configuration in each of the above-described embodiments may be omitted. Moreover, for example, at least a part of the configuration in each of the above-described embodiments may be added to or may replace a configuration in another embodiment described above.

The present disclosure may be embodied not only by the above-described microcomputer but also in various modes such as: a system including the microcomputer as a component; a program for causing a computer to function as the microcomputer; a non-transitive substantive recording medium such as a semiconductor memory in which the program is recorded; or a concentration calculation method.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2017-097314 filed May 16, 2017, incorporated herein by reference in its entirety.

What is claimed is:

1. A sensor control device configured to control a sensor including at least an oxygen pump cell which has a solid electrolyte and a pair of electrodes disposed on the solid electrolyte and which pumps oxygen into or out of a measurement chamber of the sensor in accordance with a pump current, the sensor being configured to detect a specific component contained in a gas to be measured, the sensor control device comprising:
   an analog-digital conversion unit configured to convert an inter-electrode voltage, which is an analog signal, generated between the pair of electrodes of the oxygen pump cell into a digital value;
   a current-application control value calculation unit configured to perform digital control to calculate a current-application control value for the pump current to be applied to the oxygen pump cell, based on the digital value of the inter-electrode voltage;
   a digital-analog conversion unit configured to generate the pump current to be applied to the oxygen pump cell, based on a digital signal indicating the current-application control value for the pump current;
   a first filter unit configured to perform digital calculation to extract a first filtered signal obtained by attenuating a frequency component higher than a predetermined first cutoff frequency from the digital signal indicating the current-application control value for the pump current;
   a second filter unit configured to perform digital calculation to extract a second filtered signal obtained by attenuating a frequency component higher than a predetermined second cutoff frequency from the first filtered signal extracted by the first filter unit; and
   a cutoff frequency setting unit configured to acquire frequency setting information from a source external to the sensor control device and set at least one of the first cutoff frequency and the second cutoff frequencies based on the frequency setting information, wherein
   the digital-analog conversion unit generates the pump current based on the first filtered signal,
   the second filter unit outputs the second filtered signal as a pump current signal for detecting the specific component contained in the gas to be measured.

2. The sensor control device as claimed in claim 1, wherein the first cutoff frequency is a frequency higher than the second cutoff frequency.

3. A gas detection system comprising:
   a sensor including at least an oxygen pump cell which has a solid electrolyte and a pair of electrodes disposed on the solid electrolyte and which pumps oxygen into or out of a measurement chamber of the sensor in accordance with a pump current, the sensor being configured to detect a specific component contained in a gas to be measured; and
   the sensor control device as claimed in claim 1, wherein the sensor control device is configured to control the sensor.

4. The gas detection system in claim 3, wherein the sensor includes an information storage unit, and the information storage unit is the external source.

5. The gas detection system as claimed in claim 4, wherein the cutoff frequency setting unit is configured to acquire the frequency setting information from the information storage unit at each time of start-up the sensor control device.

6. The sensor control device as claimed in claim 1, wherein the external source is a user operated manipulation unit.

7. The sensor control device as claimed in claim 1, wherein the sensor includes an information storage unit, and the information storage unit is the external source.

8. The sensor control device as claimed in claim 7, wherein the cutoff frequency setting unit is configured to acquire the frequency setting information from the information storage unit at each time of start-up the sensor control device.

9. A sensor control device configured to control a sensor including at least an oxygen pump cell which has a solid electrolyte and a pair of electrodes disposed on the solid electrolyte and which pumps oxygen into or out of a measurement chamber of the sensor in accordance with a pump current, the sensor being configured to detect a specific component contained in a gas to be measured,
   the sensor control device comprising a microcomputer programmed to:
   convert an inter-electrode voltage, which is an analog signal, generated between the pair of electrodes of the oxygen pump cell into a digital value;
   perform digital control to calculate a current-application control value for the pump current to be applied to the oxygen pump cell, based on the digital value of the inter-electrode voltage;
   generate the pump current to be applied to the oxygen pump cell, based on a digital signal indicating the current-application control value for the pump current;
   perform digital calculation to extract a first filtered signal obtained by attenuating a frequency component higher than a predetermined first cutoff frequency from the digital signal indicating the current-application control value for the pump current;
   digital calculation to extract a second filtered signal obtained by attenuating a frequency component higher than a predetermined second cutoff frequency from the first filtered signal extracted by the first filter unit;

acquire frequency setting information from a source external to the sensor control device and then set at least one of the first cutoff frequency and the second cutoff frequencies based on the frequency setting information;

generate the pump current based on the first filtered signal; and output the second filtered signal as a pump current signal for detecting the specific component contained in the gas to be measured.

10. The sensor control device as claimed in claim 9, wherein the first cutoff frequency is a frequency higher than the second cutoff frequency.

11. A gas detection system comprising:

a sensor including at least an oxygen pump cell which has a solid electrolyte and a pair of electrodes disposed on the solid electrolyte and which pumps oxygen into or out of a measurement chamber of the sensor in accordance with a pump current, the sensor being configured to detect a specific component contained in a gas to be measured; and the sensor control device as claimed in claim 9, wherein the sensor control device is configured to control the sensor.

12. The gas detection system in claim 11, wherein the sensor includes an information storage unit, and the information storage unit is the external source.

13. The gas detection system as claimed in claim 12, wherein the microcomputer is programmed to acquire the frequency setting information from the information storage unit at each time of start-up the sensor control device.

14. The sensor control device as claimed in claim 9, wherein the external source is a user operated manipulation unit.

15. The sensor control device as claimed in claim 9, wherein the sensor includes an information storage unit, and the information storage unit is the external source.

16. The sensor control device as claimed in claim 15, wherein the microcomputer is programmed to acquire the frequency setting information from the information storage unit at each time of start-up the sensor control device.

* * * * *